(12) United States Patent
Springer

(10) Patent No.: US 11,744,176 B1
(45) Date of Patent: Sep. 5, 2023

(54) LAWNMOWER BLADE LOCK

(71) Applicant: James Joe Springer, Repton, AL (US)

(72) Inventor: James Joe Springer, Repton, AL (US)

( * ) Notice: Subject to any disclaimer, the term of this patent is extended or adjusted under 35 U.S.C. 154(b) by 0 days.

(21) Appl. No.: 18/101,640

(22) Filed: Jan. 26, 2023

(51) Int. Cl.
| | | |
|---|---|---|
| *A01D 34/82* | (2006.01) | |
| *A01D 75/20* | (2006.01) | |
| *A01D 101/00* | (2006.01) | |
| *B25B 5/10* | (2006.01) | |

(52) U.S. Cl.
CPC ........... *A01D 34/828* (2013.01); *A01D 75/20* (2013.01); *A01D 2101/00* (2013.01); *B25B 5/101* (2013.01)

(58) Field of Classification Search
CPC .. A01D 34/828; A01D 75/20; A01D 2101/00; A01D 34/001; B25B 5/101
See application file for complete search history.

(56) References Cited

U.S. PATENT DOCUMENTS

| | | | |
|---|---|---|---|
| 3,173,234 A | 3/1965 | Vodinelich | |
| 4,208,859 A | 6/1980 | Brockway | |
| 4,457,033 A | 7/1984 | Lightner | |
| 4,564,991 A | 1/1986 | Talor | |
| 4,850,800 A * | 7/1989 | Zygutis | B63H 20/36 416/62 |
| 4,882,960 A | 11/1989 | Kugler | |
| 4,956,905 A * | 9/1990 | Davidson | A01D 34/001 29/213.1 |
| 6,925,787 B1 | 8/2005 | Berntson | |
| 6,928,801 B1 | 8/2005 | Papproth | |
| D897,801 S | 10/2020 | Thacker | |
| 2007/0266691 A1* | 11/2007 | Elliott | A01D 34/001 56/320.1 |
| 2018/0266258 A1 | 9/2018 | Thacker | |
| 2021/0005115 A1* | 1/2021 | Johnson | G09F 21/04 |
| 2022/0095533 A1* | 3/2022 | Smith | A01D 34/001 |

OTHER PUBLICATIONS

Amazon.com: Achla Adjustable Deck Rail Shepherd's Hooks, Black, Pack of 2; Jun. 11, 2021 per reviews (Year: 2021).*

* cited by examiner

*Primary Examiner* — Alicia Torres
(74) *Attorney, Agent, or Firm* — George L Williamson

(57) ABSTRACT

Method and apparatus for a blade lock for use with a lawnmower. The blade lock includes an adjustable intermediate shaft having a hook-like component on one end for holding the blade of the lawnmower and a clamp-like member on the opposite end for attachment to the deck of the lawnmower. The shaft portion includes a plurality of fasteners which allow the shaft to be adjustable in length.

10 Claims, 2 Drawing Sheets

LAWNMOWER BLADE LOCK

BACKGROUND OF THE INVENTION

Field of the Invention

The present invention relates generally to lawnmowers and more particularly, is concerned with a blade lock for use on a variety of lawnmowers including the push type and the riding type.

Description of the Related Art

Devices relevant to the present invention have been described in the related art; however, none of the related art devices disclose the unique features of the present invention.

In U.S. Patent Application Publication No. 2018/0266258 dated Sep. 20, 2018, Thacker disclosed a mower blade lock. In U.S. Design Pat. No. D897,801 dated Oct. 6, 2020, Thacker disclosed a mower blade lock. In U.S. Pat. No. 3,173,234 dated Mar. 16, 1965, Vodinelich disclosed a blade locking device for rotary lawnmowers. In U.S. Pat. No. 6,928,801 dated Aug. 16, 2005, Papproth disclosed a lawnmower blade stop. In U.S. Pat. No. 4,564,991 dated Jan. 21, 1986, Taylor disclosed a tool for holding a blade for installation and removal thereof. In U.S. Pat. No. 4,457,033 dated Jul. 3, 1984, Lightner disclosed an adjustable combination lock or tool. In U.S. Pat. No. 6,925,787 dated Aug. 9, 2005, Berntson disclosed a blade blacker for rotary lawnmowers. In U.S. Pat. No. 4,882,960 dated Nov. 28, 1989, Kugler disclosed a lawnmower blade lock. In U.S. Pat. No. 4,208,859 dated Jun. 24, 1980, Brockway disclosed a locking device for blade of a rotary lawnmower.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a blade lock for use with any type of lawnmower whether it be a push mower or riding mower. The present invention includes an adjustable intermediate shaft having a hook-like component on one end for holding the blade of the lawnmower and a clamp-like member on the opposite end for attachment to the deck of the lawnmower. The adjustable shaft portion of the present invention includes a plurality of fasteners which allow the shaft to be adjustable in length. Because the present invention is adjustable in length, it can be attached to and used with any type of lawnmower.

An object of the present invention is to provide a means for locking the blade or blades or a lawnmower against rotation thereof during the removal or installation of the blade. A further object of the present invention is to provide a means for locking a blade of various types of lawnmowers so that it can be used on push mowers or riding mowers. A further object of the present invention is to provide a blade locking assembly designed to provide the safe removal and installation of the blade of a lawnmower. A further object of the present invention is to provide a blade locking means which is relatively easy to use by an operator. A further object of the present invention is to provide a lawnmower blade lock which is relatively easily and inexpensively manufactured.

The foregoing and other objects and advantages will appear from the description to follow. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
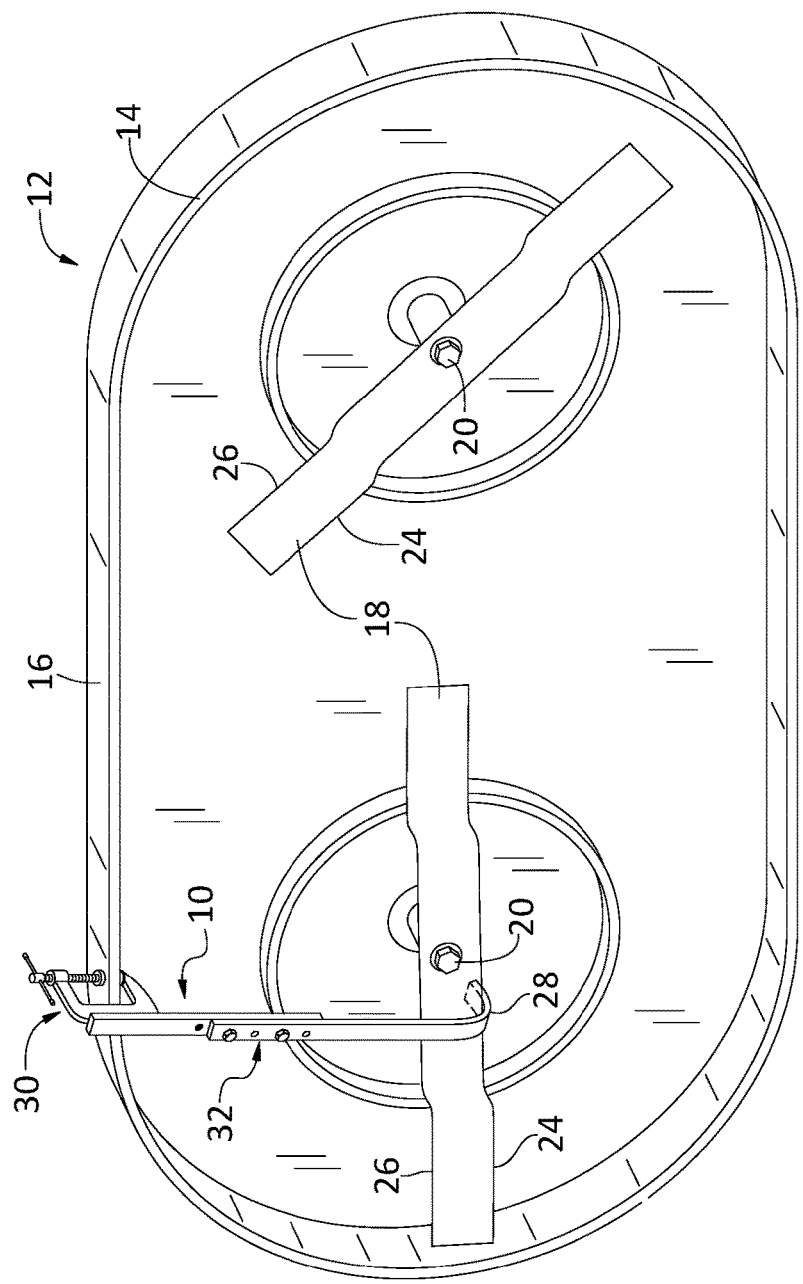
FIG. 1 is a perspective view of the present invention shown in operative connection.

With regard to reference numerals used, the following numbering is used throughout the drawings.

10 present invention
12 lawnmower
14 deck
16 sidewall of deck
18 blade
20 blade nut
24 first edge of blade
26 second edge of blade
28 hook-like member
30 damp-like member
32 adjustable shaft
34 fastener
35 apertures
36 threaded screw member
38 handle/pin
40 hand of user
42 weld

DETAILED DESCRIPTION OF THE PREFERRED EMBODIMENT

Figure 3:
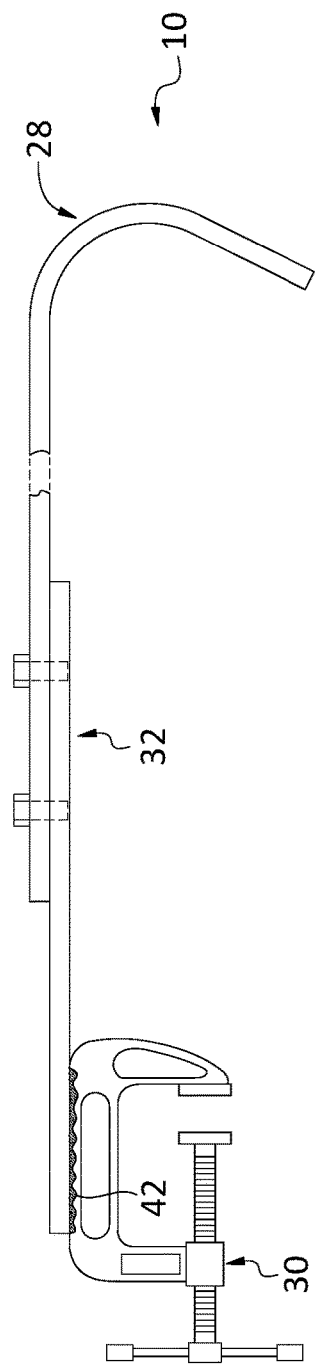
FIG. 3 is an elevation view of the present invention.
Figure 2:
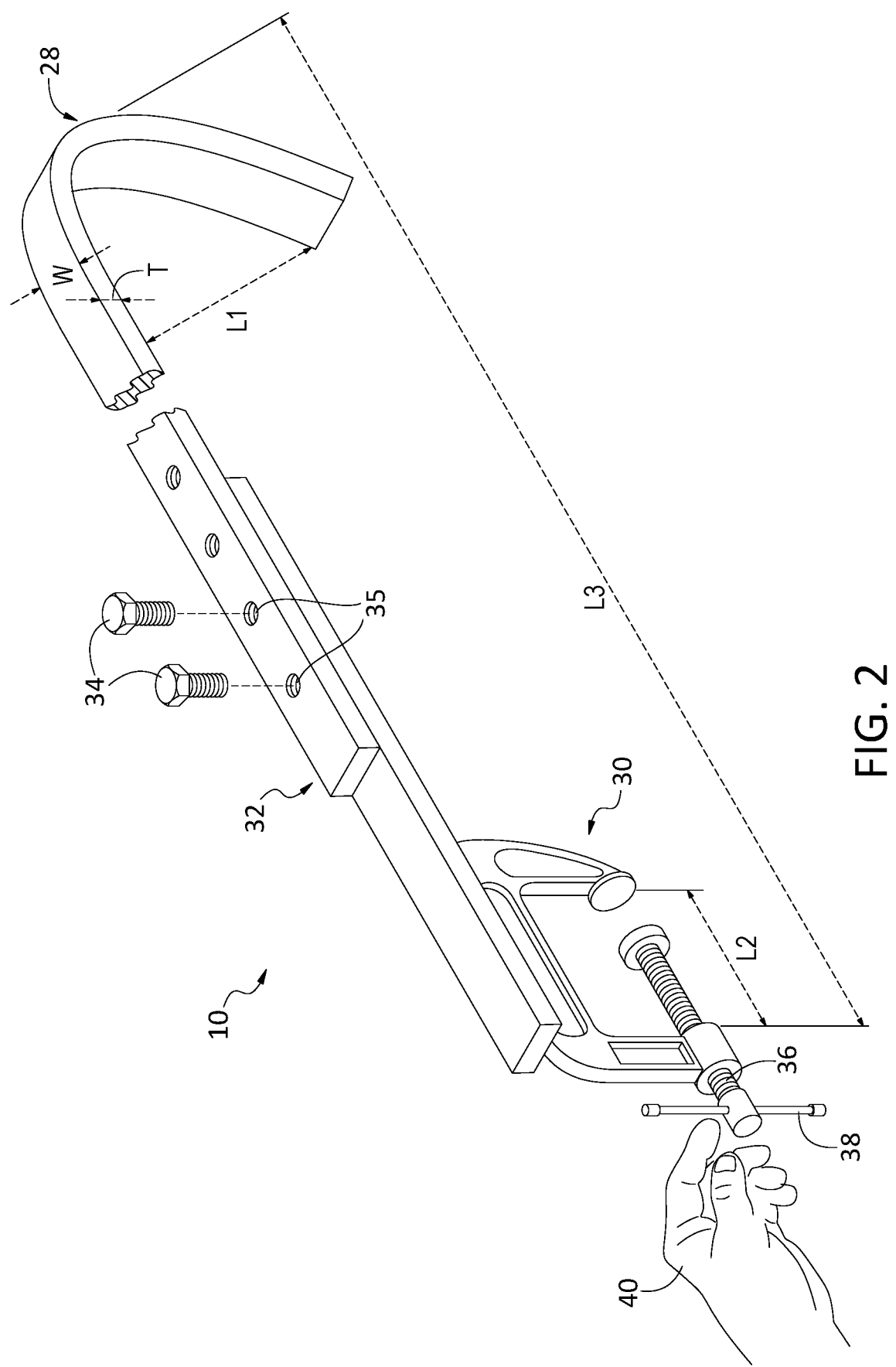
FIG. 2 is a perspective view of the present invention.

The following discussion describes in detail at least one embodiment of the present invention. This discussion should not be construed, however, as the present invention to the particular embodiments described herein since practitioners skilled in the art will recognize numerous other embodiments as well. For a definition of the complete scope of the invention the reader is directed to the appended claims. FIGS. 1 through 3 illustrate the present invention wherein a blade lock assembly for a lawnmower is disclosed and which is generally indicated by reference number 10.

Turning to FIGS. 1-3, therein is shown the present invention 10 which is useful for locking the blade of a lawnmower 12 wherein the lawnmower includes a deck 14, and a sidewall of the deck 16. The lawnmower 12 also includes a blade 18 having a central blade nut 20 for attachment and removal of a blade from the drive shaft of the motor wherein the blade also has a first edge 24 and a second edge 26, The present invention 10 has a hook-like member 28 on one end and clamp-like member 30 on the other end of an adjustable shaft 32 wherein the shaft being adjustable can be used with many sizes and shapes of lawnmowers, including riding mowers and push mowers. The adjustable shaft 32 is made adjustable by having a plurality of fasteners 34 and corresponding apertures 35 disposed intermediate between hook 28 and clamp 30 of the present invention 10. The hook 28 of the present invention 10 captures either edge 24, 26, of the blade 18 of the lawnmower 12 so that the blade 18 is securely held against movement while the nut 20 of the lawnmower is either removed or installed during the blade removal/installation process. The clamp-like member 30 of the present invention 10 is designed so that it can be easily and conveniently attached to and removed from the sidewall 16 of the deck 14 of the lawnmower 12 allowing it to fit on many sizes and shapes of decks of lawnmowers whether they be push mowers or riding mowers. The clamp portion 30 of the present invention 10 functions and resembles a C-clamp in looks and operation wherein the clamp 30 is welded at 42 to an area underneath the present invention 10 and has a threaded rotating adjustment or screw member 36 along with a sliding hand-turning pin or handle 38 which can be grabbed by the hand 40 of a user. The clamp 30 will be made of hard metal and have a small flat edge at one end and a threaded hole with a corresponding large threaded screw 36. A distal end of this screw contains a flat edge of similar size to the one at the top of the frame, along with a small metal bar or handle 38, perpendicular to the screw itself, which is used by user 40 for gaining leverage when tightening the clamp 30. When the clamp 30 is completely closed, the flat end of the screw is in contact with the flat end on the frame. The sidewall 16 of deck 14 will be captured between the top and bottom flat edges.

The present invention 10 is designed to be safe to use and enables a user 40 to attach it to a variety of lawnmowers whether they be riding lawnmowers or push mowers. Furthermore, the present invention 10 can attach to any section or portion of the sidewall 16 of the deck with its clamp 30 for removing and replacing blades 18 in a safe manner whether they be for a single blade, multi-blade, or zero turn type lawnmowers. The present invention 10 is expected to be made of steel and is to be vet strong being capable of sustaining strength in the neighborhood of 100 psi, or more. The overall length of the adjustable shaft 32 is expected to be extendable from about 19" overall when it is fully extended to about 9½" when it is in a shortened configuration. Also, the main body is approximately 13½" long wherein the blade hook is about 2½" at its base. The clamp attaching body is approximately 9½" long. The adjustable shaft 32 includes fasteners 34 which are approximately ¼" threaded bolts or the like located in a spaced-apart manner along the adjustable shaft 32. Furthermore, the present invention 10 is expected to be made of steel being approximately ¾" wide. Approximate dimensions follow: L1=2½"; L2=2½"; L3=19"; W=¾" and T=¼".

By way of summary and by making reference to FIGS. 1-3, the present invention 10 includes a method of locking a blade against accidental movement in a lawnmower including removable attaching a blade lock to a downwardly extending side wall of a deck in the lawnmower enclosing a rotatable cutting blade; the blade lock comprising an elongated shaft constructed of flat bars of rigid material and having clamp means mounted on a first end of the elongated shaft for the removable attachment to the side wall, and a hook-like member formed by one of the flat bars being curved at a second end of the elongated shaft for engaging an edge of the cutting blade for preventing rotation thereof; adjusting the length of the elongated shaft to fit the lawnmower; using the damp means to attach the blade lock to the side wall; placing the hook-like member to engage a cutting edge of the blade; and whereby maintenance work under the deck can proceed safely without fear of accidental movement of the blade. Furthermore, in which the elongated shaft comprises overlapping portions of the flat bars along a mid-portion of the length, the adjusting means comprising threaded spaced openings in the overlapping portions for accommodating threaded fasteners to lock the overlapping portions to a size required for a particular mower, thereby allowing the blade lock to he adjusted in length, and in which the clamp means comprises a C-shaped member having a central portion thereof attached to a segment of the elongated shaft adjacent the first end thereof, and first and second legs extending from opposite ends of the central portion, the first leg having a threaded opening for a threaded screw member, and the second leg having a pad aligned with the threaded screw member, whereby the side wall is clamped between a distal end of the threaded screw member and the pad of the second leg for securing the blade lock to the deck thereby preventing rotation of the cutting blade; and in which the C-shaped member is permanently attached to the elongated shaft; in which a proximal end of the threaded screw member is provided with a handle for allowing manual tightening of the clamp means on the side wall; and in which the blade lock is constructed of steel with a sustaining strength of at least 100 psi.

I claim:
1. A blade lock for and in combination with a lawnmower, comprising:
 a) said lawnmower having a deck with a downwardly extending side wall enclosing a rotatable cutting blade;
 b) said blade lock comprising an elongated shaft constructed of flat bars of rigid material having clamp means mounted on a first end of said elongated shaft and attached to said side wall, and an open hook member formed by one of said flat bars being curved at a second end of said elongated shaft engaging an edge of said cutting blade for preventing rotation thereof;
 c) said elongated shaft having means for adjusting a length thereof to allow said blade lock to be used with many sizes and shapes of lawnmowers including riding mowers and push mowers; and
 d) in which said flat bars overlap along a mid-portion of said length, said adjusting means comprising threaded spaced openings in overlapped portions of said flat bars for accommodating threaded fasteners to lock said overlapped portions together to be adjusted to a size required for a particular mower, thereby allowing said blade lock to be adjusted in length.

2. The combination of claim 1, in which said clamp means comprises a C-shaped member having a central portion thereof attached to a segment of said elongated shaft adjacent said first end thereof, and first and second legs extending from opposite ends of said central portion, said first leg having a threaded opening for a threaded screw member, and said second leg having a pad aligned with said threaded screw member, whereby said side wall is clamped between a distal end of said threaded screw member and said pad of said second leg for securing said blade lock to said deck thereby preventing rotation of said cutting blade.

3. The combination of claim 2, in which said C-shaped member is permanently attached to said elongated shaft.

4. The combination of claim 2, in which a proximal end of said threaded screw member is provided with a handle for allowing manual tightening of said clamp means on said side wall.

5. The combination of claim 4, in which said blade lock is constructed of steel with a sustaining strength of at least 100 psi.

6. A method of locking a blade against accidental movement in a lawnmower, comprising the steps of:
   a) removably attaching a blade lock to a downwardly extending side wall of a deck in said lawnmower enclosing a rotatable cutting blade;
   b) said blade lock comprising an elongated shaft constructed of flat bars of rigid material and having clamp means mounted on a first end of said elongated shaft for the removable attachment to said side wall, and an open hook member formed by one of said flat bars being curved at a second end of said elongated shaft for engaging an edge of said cutting blade for preventing rotation thereof;
   c) adjusting the length of said elongated shaft to fit said lawnmower;
   d) using said clamp means to attach said blade lock to said side wall;
   e) placing said open hook member to engage a cutting edge of said blade;
   f) whereby maintenance work under said deck can proceed safely without fear of accidental movement of said blade;
   g) in which said elongated shaft comprises overlapping portions of said flat bars along a mid-portion of said length, said adjusting means comprising threaded spaced openings in said overlapping portions for accommodating threaded fasteners to lock said overlapping portions to a size required for a particular mower, thereby allowing said blade lock to be adjusted in length.

7. The method of claim 6, in which said clamp means comprises a C-shaped member having a central portion thereof attached to a segment of said elongated shaft adjacent said first end thereof, and first and second legs extending from opposite ends of said central portion, said first leg having a threaded opening for a threaded screw member, and said second leg a pad aligned with said threaded screw member, whereby said side wall is clamped between a distal end of said threaded screw member and said pad of said second leg for securing said blade lock to said deck thereby preventing rotation of said cutting blade.

8. The method of claim 7, in which said C-shaped member is permanently attached to said elongated shaft.

9. The method of claim 7, in which a proximal end of said threaded screw member is provided with a handle for allowing manual tightening of said clamp means on said side wall.

10. The method of claim 7, in which said blade lock is constructed of steel with a sustaining strength of at least 100 psi.

\* \* \* \* \*